Jan. 8, 1929.
A. HOWELL ET AL
1,698,019
IRRIGATING MACHINE
Filed Aug. 10, 1927    2 Sheets-Sheet 1
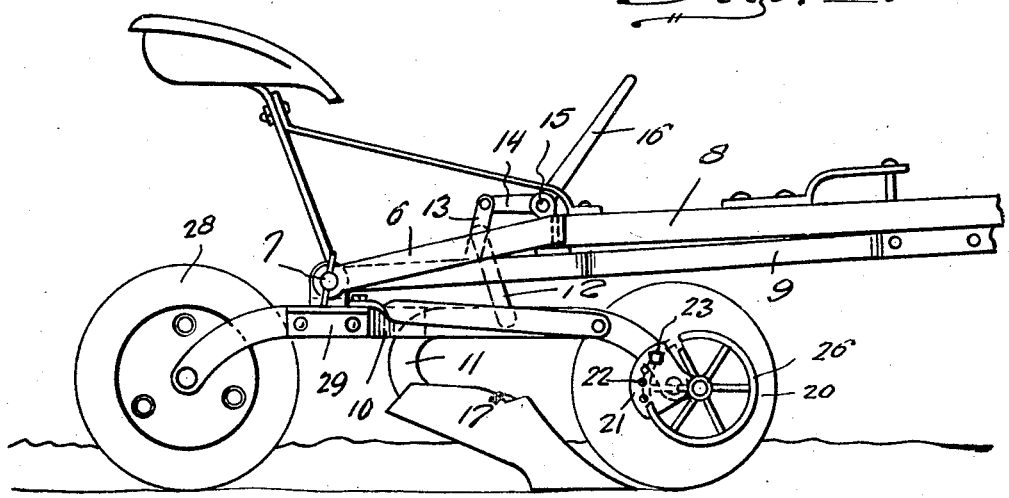
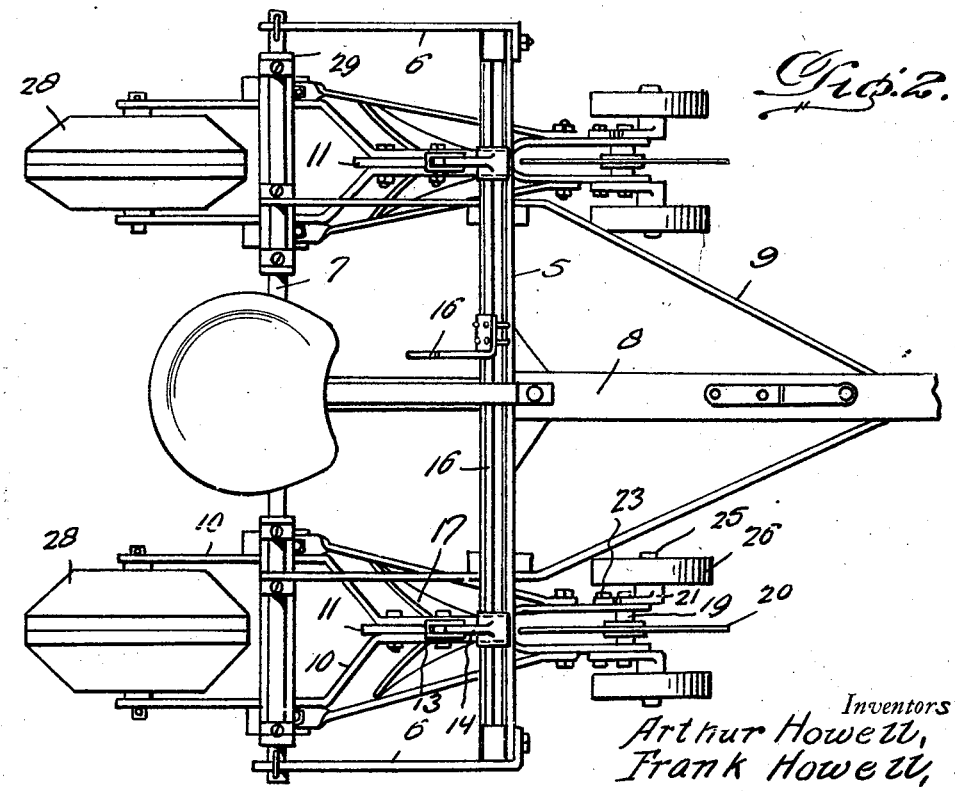
Inventors
Arthur Howell,
Frank Howell,
By Clarence A. O'Brien
Attorney

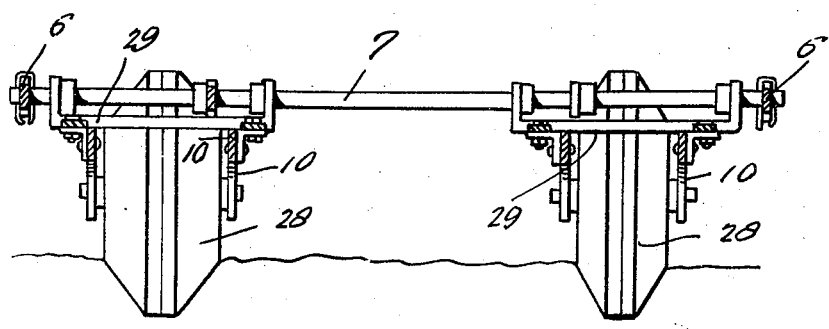
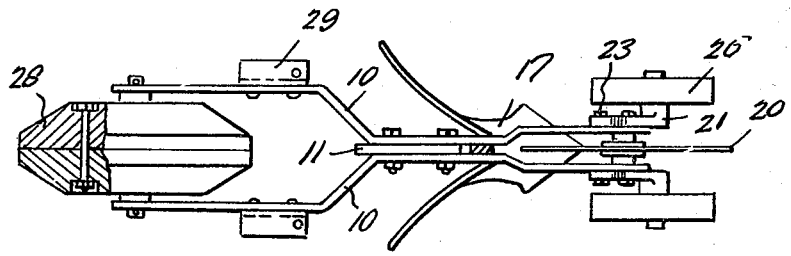
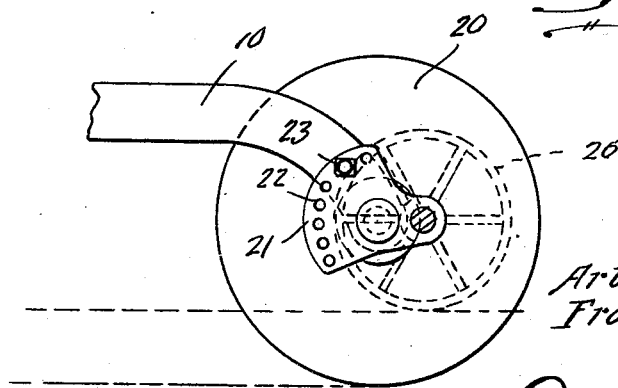

Patented Jan. 8, 1929.

1,698,019

UNITED STATES PATENT OFFICE.

ARTHUR HOWELL AND FRANK HOWELL, OF HOOD RIVER, OREGON.

IRRIGATING MACHINE.

Application filed August 10, 1927. Serial No. 212,090.

The present invention relates to an efficient irrigating and ditching device for irrigation.

The prime object of the invention resides in the provision of a structure of this nature which reduces irrigating to an easy mechanical process no matter whether it be in smooth or rocky ground, in mulch, or in sod. The device consists in a rolling coulter ahead of a plow with sufficient weight behind it to maintain it in proper position for irrigating the ground to obtain the utmost efficiency out of irrigation, by the production of clean-cut furrows properly smoothed out for the flow of water.

Another very important object of the invention resides in the provision of a device of this nature which is comparatively simple in its construction, inexpensive to manufacture, strong and durable, thoroughly efficient and reliable in operation, easy to manipulate, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of an apparatus of this nature embodying the features of our invention, Figure 2 is a top plan view thereof, Figure 3 is a transverse vertical section therethrough, Figure 4 is a top plan view partly in section of one of the units, Fig. 5 is a side elevation of the front wheel adjusting means.

Referring to the drawing in detail it will be seen that the frame structure comprises a front bar 5, side bars 6, and a rear bar 7. A tongue 8 projects forwardly from the center of the front bar 5 for draft purposes and is properly braced as at 9, these braces 9 extending rearwardly to the rear bars 6 under the front bar structure. Two furrow forming units are mounted on the frame. Each unit comprises a pair of rods 10 the intermediate portions of which are fixed to a filler piece 11 which is engaged by a link 12 and 13 to a crank 14 on a shaft 15 rockable by a crank 16. This filler piece 11 is the shank of a furrow shovel or plow 17. The forward ends of the rods 10 are disposed in spaced parallelism and curve downwardly and have the shaft 19 of a rolling coulter 20 journaled therein or rather therethrough. Brackets 21 are rotatable on the extremities of the shaft 19 and have series of openings 22 therein so that bolts 23 may be engaged therewith and with the forward ends of the rods to hold these brackets in different adjusted position. The brackets have journaled on their lateral extensions 25 guide wheels 26 one to each side of the coulter 20. The rear ends of the rods 10 are in spaced parallelism and are farther apart than the forward ends and have journaled therebetween balancing wheels and packers 28. Brackets 29 are fixed to the rear ends of the units across the rear ends of the rods 10 and are journaled on the rear bar 6 so that by the adjusting means heretofore described the units may be rocked.

This apparatus may be constructed of one or more of the gangs or units described. The gangs operate to pull down on the coulters sufficient for the suction of the shovels so that said shovels function to suck down the coulters until the guide wheels are flush with the surface of the ground. The result of this operation is a furrow or ditch the same depth continuously. The back wheel or packer balances the implement and packs the bottom of the furrow smooth and forms slanting side walls because of the shape clearly shown.

It is thought that the construction, utility, operation, and advantages of the invention will now be quite apparent to those skilled in this art without a more detailed description thereof. It is apparent that changes in the details of construction, and in the combination and arrangement of parts may be resorted to without departing from the spirit and scope of the invention as hereinafter claimed or sacrificing any of its advantages. In fact the present embodiment of the invention has been disclosed merely by way of example since in actual practice it attains the features of advantage enumerated as desirable in the statement of the invention and the above description.

Having thus described our invention, what we claim as new is:—

1. An implement of the class described comprising a frame, a unit on the frame, said unit including a frame structure having a coulter rotatably mounted at the forward end, a packer wheel rotatably mounted at the rear end, and a shovel mounted intermediate its ends, a pair of guide wheels journaled at the forward end of the frame structure one to each side of the coulter to regulate the depth of cutting of said coulter.

2. An implement of the class described comprising a frame, a bracket rockable on the frame, a pair of rods having their intermediate portions fixed to the bracket, a balancing and packing wheel journaled between the rear extremities of the rods, a coulter disc mounted for rotation between the forward extremities of the rods, brackets mounted on the forward ends of the rods one to each side of the coulter disc, guide wheels journaled on said brackets, and a shank mounted between the intermediate portions of the rods and extending downwardly therefrom and having a shovel thereon.

3. An implement of the class described comprising a frame, a bracket rockable on the frame, a pair of rods having their intermediate portions fixed to the bracket, a balancing and packing wheel journaled between the rear extremities of the rods, a coulter disc mounted for rotation between the forward extremities of the rods, brackets mounted on the forward ends of the rods one to each side of the coulter disc, guide wheels journaled on said brackets, a shank mounted between the intermediate portions of the rods and extending downwardly therefrom and having a shovel thereon, and means engaged with the shank for rocking the rods.

4. An irrigating unit of the class described comprising a frame structure, wheels arranged in pairs at the forward end of the frame structure, means for adjustably mounting the wheels on the forward end of the frame structure, a coulter rotatably mounted in the forward end of the frame structure between the wheels, a packer wheel journaled in the rear of the frame structure, and a shovel mounted intermediate the frame structure therebelow.

In testimony whereof we affix our signatures.

ARTHUR HOWELL.
FRANK HOWELL.